(12) United States Patent
Montellese

(10) Patent No.: US 7,671,843 B2
(45) Date of Patent: Mar. 2, 2010

(54) VIRTUAL HOLOGRAPHIC INPUT METHOD AND DEVICE

(76) Inventor: Steve Montellese, 2661 Clearview Rd., Allison Park, PA (US) 15101

( * ) Notice: Subject to any disclaimer, the term of this patent is extended or adjusted under 35 U.S.C. 154(b) by 493 days.

(21) Appl. No.: 10/706,720

(22) Filed: Nov. 12, 2003

(65) Prior Publication Data

US 2004/0095315 A1 May 20, 2004

Related U.S. Application Data

(60) Provisional application No. 60/424,842, filed on Nov. 12, 2002.

(51) Int. Cl.
*G06F 3/02* (2006.01)
*G09G 5/00* (2006.01)
*G01B 9/021* (2006.01)

(52) U.S. Cl. .................. 345/168; 345/156; 356/457

(58) Field of Classification Search .............. 345/156, 345/168, 169, 173, 175, 176; 463/31; 356/457, 356/458
See application file for complete search history.

(56) References Cited

U.S. PATENT DOCUMENTS

| | | | |
|---|---|---|---|
| 4,032,237 A | 6/1977 | Julesz | |
| 4,468,694 A | 8/1984 | Edgar | |
| 4,757,380 A | 7/1988 | Smets et al. | |
| 4,782,328 A | 11/1988 | Denlinger | |
| 4,808,979 A | 2/1989 | DeHoff et al. | |
| 4,843,568 A | 6/1989 | Krueger et al. | |
| 4,871,252 A * | 10/1989 | Beni et al. ................ 356/457 |
| 4,875,034 A | 10/1989 | Brokenshire | |
| 4,893,120 A | 1/1990 | Doering et al. | |
| 5,168,531 A | 12/1992 | Sigel | |
| 5,216,527 A * | 6/1993 | Sharnoff et al. ............... 359/10 |
| 5,322,441 A | 6/1994 | Lewis et al. | |
| 5,334,991 A | 8/1994 | Wells et al. | |
| 5,414,413 A | 5/1995 | Tamaru et al. | |
| 5,436,639 A | 7/1995 | Arai et al. | |
| 5,528,263 A | 6/1996 | Platzker et al. | |
| 5,605,406 A | 2/1997 | Bowen | |
| 5,767,842 A | 6/1998 | Korth | |
| 6,008,800 A | 12/1999 | Pryor | |
| 6,031,519 A * | 2/2000 | O'Brien ..................... 345/156 |

(Continued)

FOREIGN PATENT DOCUMENTS

JP 60-69728 A 4/1985

(Continued)

OTHER PUBLICATIONS

Seymour S. Levine, "Application of Three-Dimensional Vision Systems to Industrial Robotic Manufacturing and Inspection Operations," reprint from *SAMPE Quarterly*, Oct. 1983, pp. 137-141.

(Continued)

*Primary Examiner*—Bipin Shalwala
*Assistant Examiner*—Steven E Holton

(57) ABSTRACT

An input device for detecting input with respect to a three dimensional area in space. The input device includes an electromagnetic wave interference projector and receiver. The analysis of the difference between the projected interference pattern and the received interference pattern will determine the type and location of the user input. In addition, this holographic type of wave interference will display the image to be "manipulated" or "touched".

13 Claims, 4 Drawing Sheets

U.S. PATENT DOCUMENTS

| | | | |
|---|---|---|---|
| 6,211,848 B1 * | 4/2001 | Plesniak et al. | 345/156 |
| 6,281,878 B1 | 8/2001 | Montellese | |
| 6,650,318 B1 * | 11/2003 | Arnon | 345/168 |
| 6,710,770 B2 * | 3/2004 | Tomasi et al. | 345/168 |
| 7,259,747 B2 * | 8/2007 | Bell | 345/156 |

FOREIGN PATENT DOCUMENTS

| | | |
|---|---|---|
| JP | S60-69728 | 4/1985 |

OTHER PUBLICATIONS

IR. A.C.M. Gieles, Dr. W. J. Venema, "Inspection of SMD's With 3-D Laser Scanning," Apr. 24-27, 1989, pp. 5-59-5-71, Chicago, Illinois.

Herbert Kaplan, "3-D Gauging With Laser Triangulation," Jul. 1994, *Photonics Spectra*, Laurin Publishing Co., Inc.

* cited by examiner

VIRTUAL HOLOGRAPHIC INPUT METHOD AND DEVICE

This Application claims priority to Provisional Application Ser. No. 60/424,842, Filed: Nov. 12, 2002

BACKGROUND OF THE INVENTION

The present invention is directed generally and in various embodiments to an apparatus and method for inputting data by interaction with a template display in space. Non-holographic versions of remotely sensed human movement and position data input devices already exist. For example, U.S. Pat. No. 6,281,878, Apparatus and Method for Inputting Data which is incorporated herein by reference. The present invention in various embodiments goes beyond this previous realization by using the actual projected image as the medium for sensing the human motion and location as well as a method for allowing 3 dimensional, "floating" holographic images to be used.

Input devices are used in almost every aspect of everyday life, including computer keyboards and mice, automatic teller machines, control panels, vehicle controls, and countless other applications. Input devices, like most things, typically have a number of moving parts. A conventional keyboard, for example, has moveable keys that open and close electrical contacts. Moving parts, unfortunately, are likely to break or malfunction before other components, particularly solid state devices. Such malfunction or breakage is even more likely to occur in conditions that are dirty or dusty. Furthermore, input devices have become a limiting factor in the size of small electronic devices, such as laptop computers and personal organizers. For example, to be efficient a keyboard input device must have keys that are spaced at least as far apart as the size of the user's finger tips. Such a large keyboard has become a limiting factor as electronic devices become smaller.

Some prior art devices have attempted to solve one or more of the abovementioned problems. For example, touch screens can sense a user touching an image on the monitor. Such devices, however, typically require sensors and other devices in, on, or around the monitor. Furthermore, reducing the size of such an input device is limited to the size of the monitor.

Other prior art devices sense the position of a user's finger using light sensors. Those devices, however, often require light sensors to be located above and perpendicular to the keyboard, or other input device. As a result, they tend to be bulky and are not suited for use in small, hand-held devices.

Other prior art devices sense position of a user's finger with light sensors located on the surface to be monitored. In the case of a keyboard, for example, such devices typically require that sensors be located at the corners or other boundaries of the keyboard. As a result, they are bulky because the sensors must be spread out to be at least the same size as the keyboard. Such a device does not lend itself to use in a small, hand held device or in providing a full sized keyboard, or other input device.

All of the abovementioned devices require sensor(s) to operate separate from the display (template) for sensing and inputting the data and are relative to a limited two dimensional space.

SUMMARY OF THE INVENTION

The present invention in various embodiments incorporates the display and sensor as a set of complementary devices and overcomes deficiencies in the prior art by providing for an input device that is compact and that allows for a full sized keyboard or other input means to be provided. Unlike prior art devices that require sensors to be located directly above the area to be sensed or at the boundaries of the area to be sensed, the present invention in various embodiments allows the input device to be self contained and remote from the area to be sensed and usable in three dimensional space.

Other advantages and benefits of the present invention will become apparent from the description herein below.

BRIEF DESCRIPTION OF THE DRAWINGS

For the present invention to be clearly understood and readily practiced, the present invention will be described in conjunction with the following figures, wherein.

DETAILED DESCRIPTION

Figure 1:
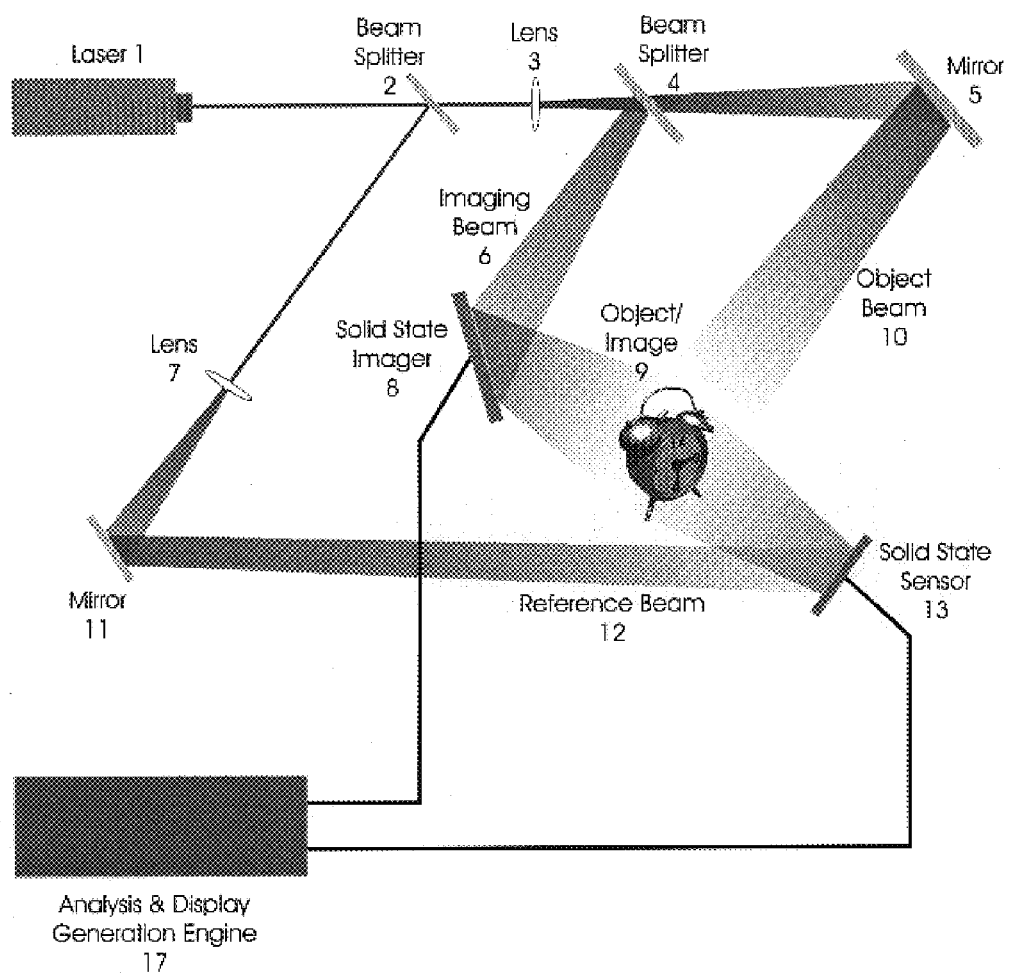
FIG. 1 is a diagram illustrating an input device constructed in accordance with an embodiment of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize that other elements may be desirable and/or required in order to implement the present invention. However, because such elements are well known in the art, and because they do not facilitate a better understanding of the present invention, a discussion of such elements is not provided herein.

First, embodiments of the invention generate a real time, computer generated, digital hologram. A holographic image is generated by shining coherent light on or through a piece of photographic film that has been exposed in a specific way and contains an interference pattern of the image to be recreated. The coherent light is then redirected (by reflection and/or refraction) to reform the original image that it was exposed to. Inasmuch, if the photographic film is replaced with a solid state display device 8 (either reflective or Transmissive, LCD type or other), and generate the interference pattern via computer generated graphics, the hologram image can be created without ever having recorded the original object. Such is a three dimensional paradigm of what commonly exists as 2 dimensional computer graphics.

Second, the invention utilizes the ability to dynamically record holograms digitally, in real time. This is accomplished by setting up a holographic recording scenario utilizing a split beam laser to generate a reference beam 12 and an object beam 10. Instead of the interference occurring on a piece of photographic film, it occurs at the surface of a two dimensional sensor, such as a high resolution CCD video sensor 13. In this setup, the video sensor 13 will connect to an analysis engine 17 that performs the image generation and can store and/or analyze the incoming interference pattern. This is analogous to what is now used for computer image analysis in two dimensions.

As shown in FIG. 1, a hologram of the item to be displayed is generated by the output imager 8. For example, a keyboard can be generated. The interference pattern required for the object to be generated is created by the analysis engine 17, or learned and stored in the analysis engine 17 by showing the sensor 13 the item in holographic recording mode. The generated image is seen by the solid state sensor 13. That is, the item is "generated" by the display 8, and "seen" by the sensor 13. The interference pattern as seen by the sensor 13 (generated by the imager 8) is the same nominal pattern as was used to generate the image. A computer comprising an analysis engine 17 will compare these images (the pattern used to create the image vs. the actual sensed pattern of the image) and find no significant difference. The comparison can be done in feature space (analysis of the transform of the pattern into image components) or as a global comparison (bit mapping one pattern against the other). The analysis engine 17 can be microprocessor based, a hard wired circuit, or any of a number of tools used for this type of image or pattern analysis. The imager 8 may be, for example, a reflective solid state imaging device or a transmissive solid state imaging device. The waves generated by the imager may be in the visible or invisible spectral range. The sensor 13 may be a solid state sensing device, and may be specifically balanced for a spectral range corresponding to the waves generated by the imager 8.

Figure 2:
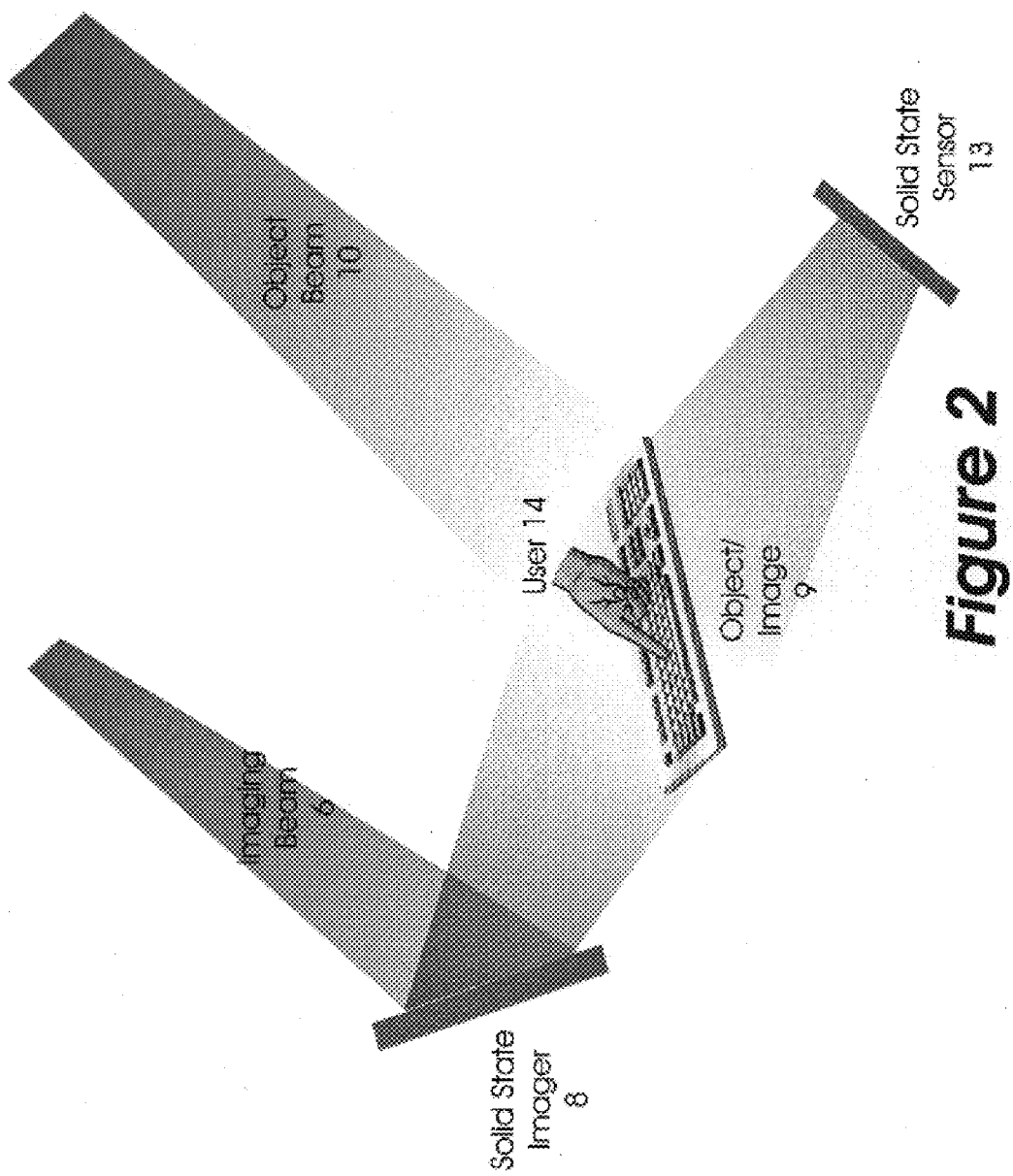
FIG. 2 is a diagram showing the image as a keyboard input device with the user interacting with the system.

When someone (or something) interferes with the display as shown in FIG. 2, e.g., in this keyboard scenario the user places a finger on a key 14, the pattern on the sensor changes. This new pattern is then processed by the analysis engine 17 to analyze what has happened. This can be done by training the differences in the pattern (empirically by training and tabulating the results) depending upon where a finger is placed, or by actual transformation and analysis of the pattern for an interpretation of what and where the change is.

Figure 3:
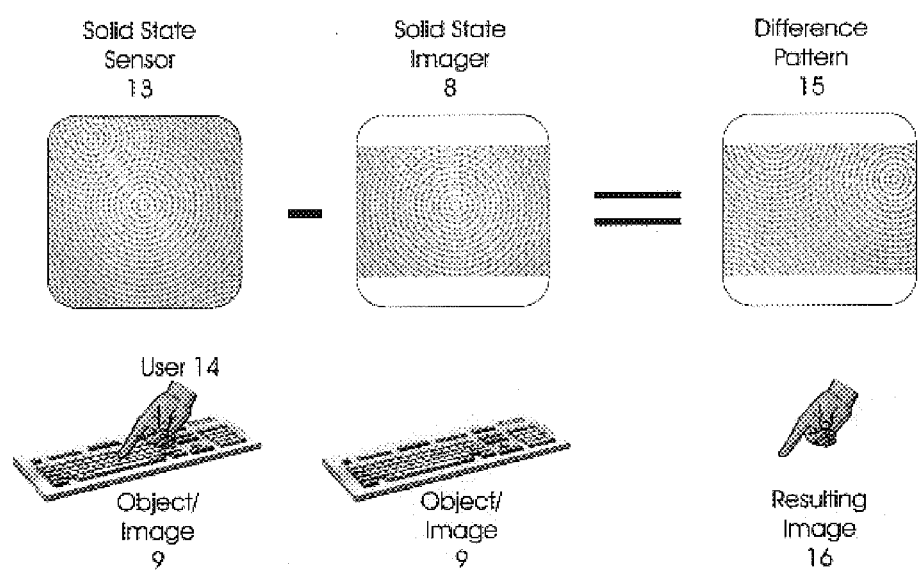
FIG. 3 is a schematic representation the images received and created at the sensor and emitter, respectively of the system as well as the imagery transforms of these combinations.

FIG. 3 shows schematically an example of what the interference patterns representing a keyboard and the interaction of a user might look like. The resulting difference pattern 15, which is the result of the elimination of the original keyboard template 9, from the newly created pattern 9 and 14, is then transformed into the resulting image 16.

In addition, the template image 9 can be modified to respond to the user's interactions. For example, in the case of the keyboard, the keyboard image can be reconfigured such that the key that the user "pressed" will now be changed in the image to represent a pressed position. A "virtual steering wheel" might move with the user turning the wheel to steer. Any number of interaction scenarios can be conceived and implemented. For example, the image may represent an input terminal, a keyboard, a pointing device, a game, a musical instrument. The device 8 may also comprise an interface (not shown) for connecting the device 8 to a computer (not shown), such that data representing the movement and position of the object (e.g., a finger or hand of the user, or a pointer) can be transferred from the device 8 to the computer via the interface. The interface may be hard wired or wireless. For a wireless interface, an infrared, RF or microwave wireless interface may be used.

Those of ordinary skill in the art will recognize that many modifications and variations of the present invention may be implemented. For example, the invention was described with respect to a user's finger 14 being used to select items on the input template 9, although other things, such as pencils and pens, may be used to select items on the input template 9. The foregoing description and the following claims are intended to cover all such modifications and variations.

Figure 4:
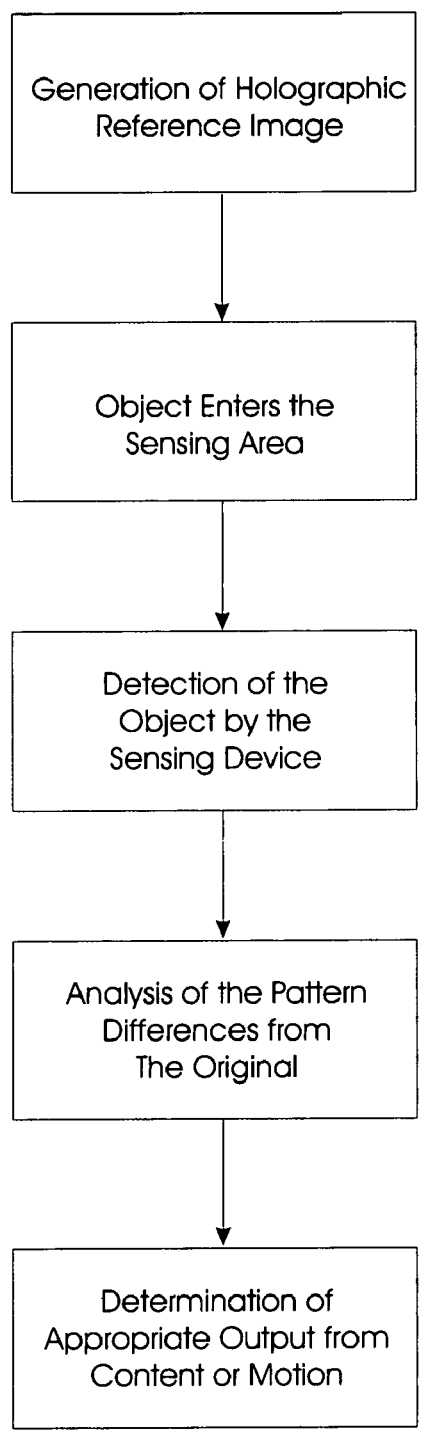
FIG. 4 is a flow chart of a method for detecting an object in an area.

FIG. 4 is a flow chart for the method for detecting an object in an area. The method comprises the steps detailed in the chart.

I claim:

1. A system for detection of an object in an area in space, the system comprising:
   a light source for generating a beam of coherent light;
   a first beam splitter for splitting the coherent light into a reference beam and an object beam;
   an imager;
   a second beam splitter for directing coherent light from the source as an imaging beam to the imager, wherein the imager is for projecting an original holographic image onto the area;
   a reception device for sensing the imaged area, wherein the reception device is specifically balanced for a spectral range corresponding to the waves generated by the image, and wherein the reference beam and the object beam interfere at a sensing surface of the reception device; and
   a computer in communication with the reception device and the imager, wherein the computer is for determining a difference pattern between an interference pattern for the original holographic image and an interference pattern for the image sensed by the reception device, and wherein the difference pattern is used to project a modified holographic image that represents a change in the original holographic image that results from an object interacting with the original holographic image.

2. The system according to claim 1, wherein the imager comprises a reflective solid state imaging device.

3. The system according to claim 1, wherein the reception device is a solid state sensing device.

4. The system according to claim 1, wherein the original holographic image represents one of an input terminal, a keyboard, a pointing device, a game, and a musical instrument.

5. The system according to claim 1, wherein the imager comprises a transmissive solid state imaging device.

6. The system according to claim 1, wherein the sensor comprises a CCD video sensor.

7. The system according to claim 1, wherein the original holographic image comprises an image of a steering wheel.

8. A method comprising:
   projecting a beam of coherent light from a light source;
   splitting by a first beam splitter the coherent light into a reference beam and an object beam;
   directing by a second beam splitter coherent light from the source as an imaging beam to an imager;
   projecting an original holographic image from the imager onto an area in a space;
   sensing the imaged area with a reception device, wherein the reference beam and the object beam interfere at a sensing surface of the reception device; and
   determining a difference pattern between an interference pattern for the original holographic image and an interference pattern for the image sensed by the reception device; and
   modifying the original holographic image projected by the imager based on the determined difference pattern, wherein the modification represents a change in the original holographic image that results from an object interacting with the original holographic image.

9. The method of claim 8, wherein:
   the original holographic image represents a user input device for an object; and
   the difference between the original holographic image and the interference pattern for the image sensed by the reception device is cause by user interaction with the image of the user input device.

10. The method of claim 9, wherein the user input device comprises a keyboard.

11. The method of claim 9, wherein the user input device comprises a steering wheel.

12. The method of claim 8, wherein determining the difference pattern between the interference pattern for the original holographic image and the interference pattern for the image sensed by the reception device comprises using a feature space analysis to determine the difference pattern.

13. The method of claim 8, wherein determining the difference pattern between the interference pattern for the original holographic image and the interference pattern for the image sensed by the reception device comprises using a bit mapping to determine the difference pattern.

* * * * *